US008199161B2

(12) United States Patent
Kaga

(10) Patent No.: US 8,199,161 B2
(45) Date of Patent: Jun. 12, 2012

(54) IMAGE PROCESSING DEVICE AND IMAGE PROCESSING METHOD

(75) Inventor: Katsumi Kaga, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 724 days.

(21) Appl. No.: 12/142,583

(22) Filed: Jun. 19, 2008

(65) Prior Publication Data

US 2009/0027405 A1 Jan. 29, 2009

(30) Foreign Application Priority Data

Jul. 26, 2007 (JP) ................................ 2007-194826

(51) Int. Cl.
*G09G 5/39* (2006.01)
*G06T 1/60* (2006.01)

(52) U.S. Cl. ........................................ 345/531; 345/530

(58) Field of Classification Search ........................ None
See application file for complete search history.

(56) References Cited

U.S. PATENT DOCUMENTS

| | | | | |
|---|---|---|---|---|
| 2003/0023410 | A1* | 1/2003 | Roth | 702/188 |
| 2004/0239676 | A1* | 12/2004 | Yoo | 345/501 |
| 2007/0057931 | A1 | 3/2007 | Takamori | |
| 2007/0120763 | A1 | 5/2007 | De Paepe et al. | |
| 2008/0151113 | A1* | 6/2008 | Park | 348/500 |
| 2008/0151119 | A1* | 6/2008 | Suzuki | 348/569 |

FOREIGN PATENT DOCUMENTS

| | | |
|---|---|---|
| CN | 1397921 A | 2/2003 |
| JP | 11-015425 | 1/1999 |
| JP | 2000-307449 | 11/2000 |
| JP | 2006-119399 | 5/2005 |
| JP | 2005-341190 | 12/2005 |
| JP | 2006-203725 | 8/2006 |
| JP | 3861915 | 12/2006 |
| JP | 2007-079177 | 3/2007 |
| JP | 200778980 | 3/2007 |
| JP | 2007-096604 | 4/2007 |
| JP | 2007-108198 | 4/2007 |
| JP | 2007-124469 | 5/2007 |
| JP | 2007-158903 | 6/2007 |

OTHER PUBLICATIONS

European Search Report in counterpart application dated Sep. 29, 2010.
Chinese Office Action dated Jan. 8, 2010, Chinese Patent Application No. 200810111440.9 (with English translation).
Japanese Office Action dated Apr. 24, 2012, filed in Japanese counterpart Application No. 2007-194826, 4 pages.

* cited by examiner

*Primary Examiner* — Jacinta M Crawford
(74) *Attorney, Agent, or Firm* — Patterson & Sheridan, LLP

(57) ABSTRACT

According to one embodiment, an image processing device of the invention includes a storage portion which stores EDID information, a communication portion which executes communication based on HDMI standard with another image processing device through a communication passage, supplies the EDID information stored in the storage portion and receives an image/sound signal from the another image processing device, a reproducing portion which reproduces the image/sound signal received by the communication portion, and a changing portion which changes the EDID information stored in the storage portion when the reproducing portion cannot reproduce the image/sound signal properly.

10 Claims, 8 Drawing Sheets

111 (121)

| Pin | Signal | Pin | Signal |
|---|---|---|---|
| 1 | TMDS data 2+ | 2 | TMDS data 2+ shield |
| 3 | TMDS data 2- | 4 | TMDS data 1+ |
| 5 | TMDS data 1 shield | 6 | TMDS data 1- |
| 7 | TMDS data 0+ | 8 | TMDS data 0 shield |
| 9 | TMDS data 0- | 10 | TMDS clock+ |
| 11 | TMDS data clock shield | 12 | TMDS clock- |
| 13 | CEC | 14 | Reserved ( unconnected ) |
| 15 | SCL | 16 | SDA |
| 17 | DDC / CEC ground | 18 | +5V power supply |
| 19 | Hot plug detection | | |

EDID item list

Header
ID Manufacturer Name
ID Product Code
ID Serial Number
Week of Manufacture
Year of Manufacture
EDID Version Number
EDID Revision Number
Video Input Definition
Max. Horizontal Image Size
Max. Vertical Image Size
Display Transfer Characteristic ( Gamma )
Feature Support
Color Characteristics
Established Timings 1
Established Timings 2
Established Timings 3
Standard Timing Identification
Detailed Timing Description #1 - 1080p
( 59.94 / 60Hz )
( preferred )
Detailed Timing Description #2 - 480p 16:9
( 59.94 / 60Hz )
( next preferred )
Monitor Descriptor - Monitor Name
Monitor Descriptor - Monitor Range Limits
Extension Flag
Checksum
Tag
Revision Number
Byte number offset
Total Number of Native Formats
Video Tag
Audio Tag
Vender Specific code Tag
( CEC Physical address )

/* Description part of HDMI1.3 ( DeepColor, LipSync, xvYCC )*/ ←This information is to be deleted or added.
Detailed Timing Description #3 - 1080i
( 59.94 / 60Hz )
Detailed Timing Description #4 - 720p
Horizontal Image Size
Vertical Image Size
Horisontal vertical Image size
Detailed Timing Description #5 - 480p 4:3
( 59.94 / 60Hz )
Detailed Timing Description #6 - 480i 4:3
Checksum ← Correct checksum also

FIG. 5

1

IMAGE PROCESSING DEVICE AND IMAGE PROCESSING METHOD

CROSS-REFERENCE TO RELATED APPLICATIONS

This application is based upon and claims the benefit of priority from Japanese Patent Application No. 2007-194826, filed Jul. 26, 2007, the entire contents of which are incorporated herein by reference.

BACKGROUND

1. Field

One embodiment of the invention relates to an image processing device having a communication function based on high-definition multimedia interface (HDMI) for rewriting information of extended display identification data (EDID) of the HDMI corresponding to the communication situation.

2. Description of the Related Art

In the HDMI, control information such as LipSync, xvYCC, DeepColor are supported by a standard called HDMI1.3. The information relating to these is described in the control information of the EDID on the TV side and a source device side sends a signal optimum for the EDID by referring to this EDID. LipSync is information about sound delay control, xvYCC is information about extended the color space which can be received, and DeepColor is information about color depth which can be received.

However, some kinds of source devices not corresponding to the HDMI1.3 malfunction when there is a description for the HDMI1.3 in the EDID (they operate in DVI mode to produce no sound) and, to operate them normally, the EDID needs to be returned to HDMI1.2 mode.

In the communication system of the HDMI, there has been known a technology indicating a countermeasure with a sink device when transmission/reception of the EDID fails.

Jpn. Pat. Appln. KOKAI Publication No. 2007-078980 has disclosed a technology which comprises turning off a hot plug or turning off a receiver sense when a sink device of a HDMI-based communication system receives other signals than the EDID because no proper EDID is sent.

However, the conventional technology of Jpn. Pat. Appln. KOKAI Publication No. 2007-078980 is a technology under which the function of the sink device is stopped when supply of the EDID fails, and this technology does not represent any solution to the fundamental problem of how the EDID should be changed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

2

Figure 3:
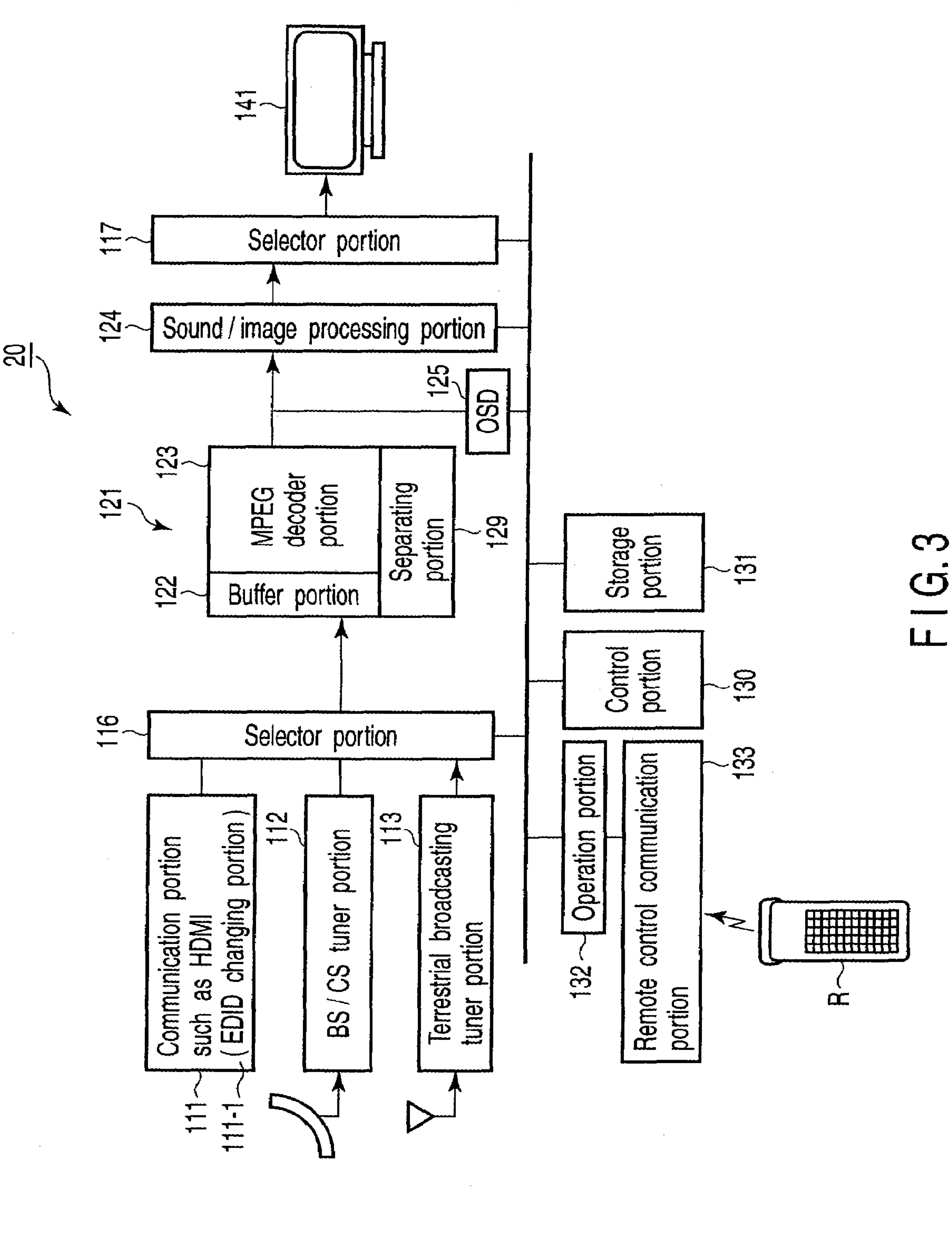
Figure 4:
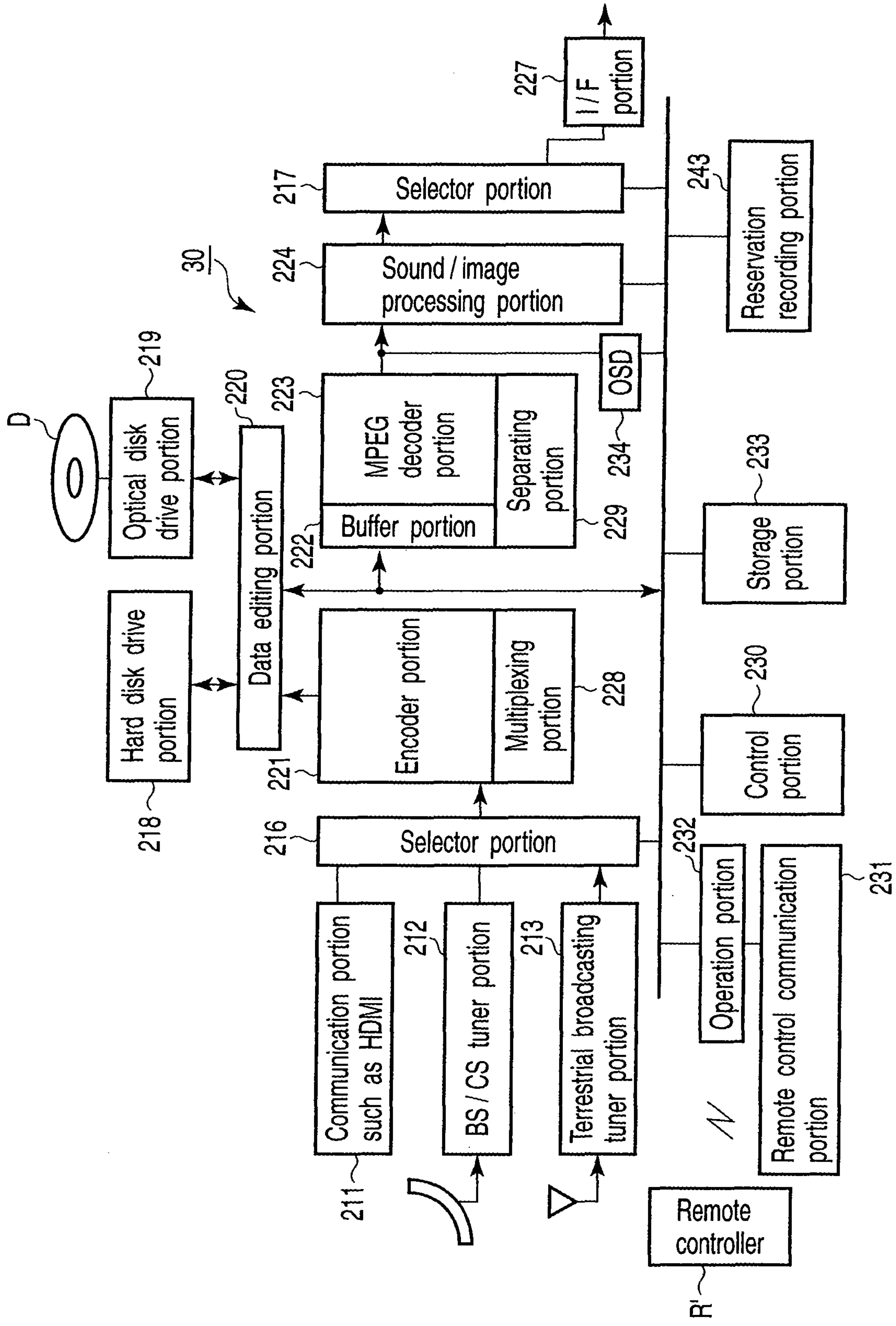
Figure 6:
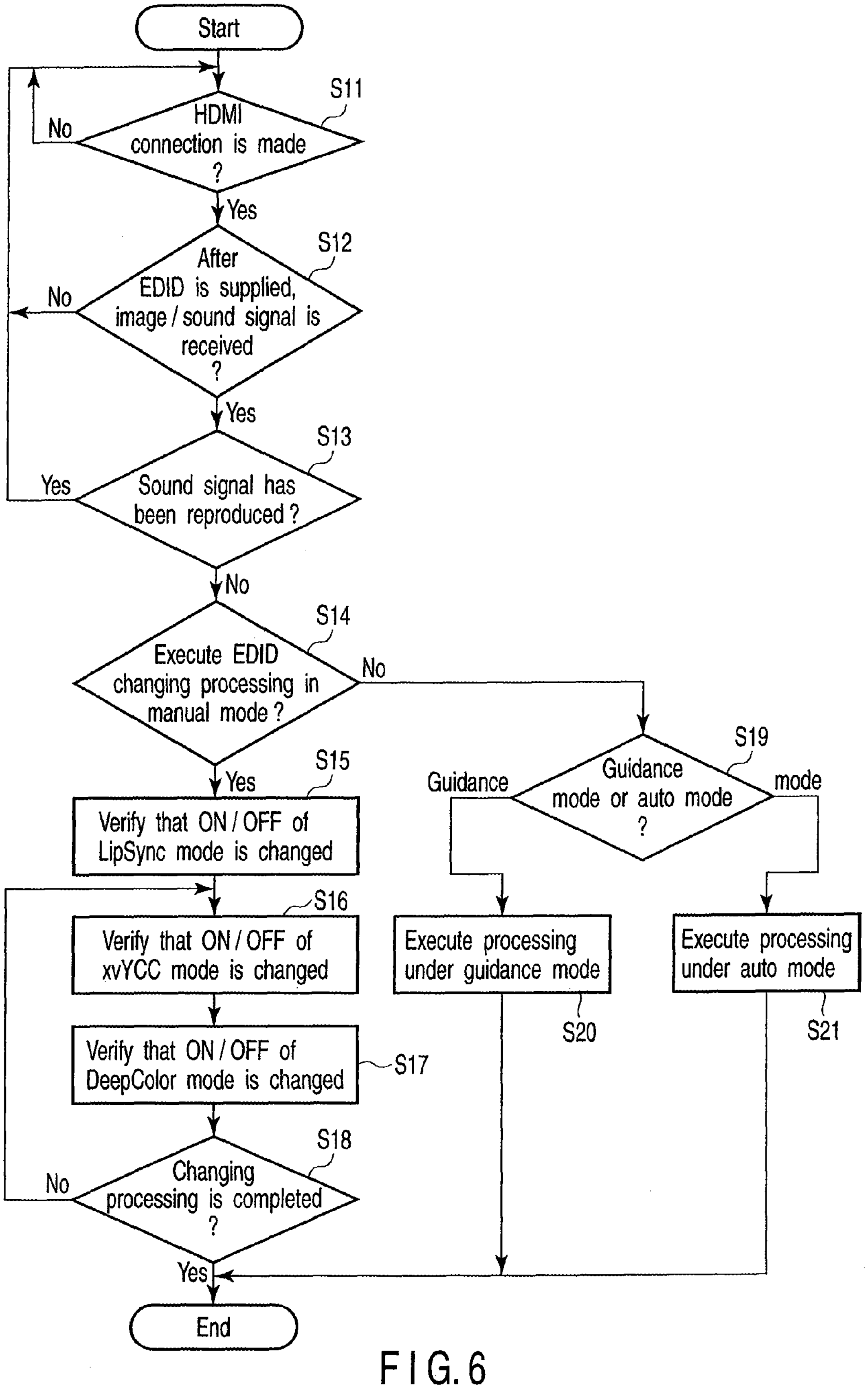
Figure 7:
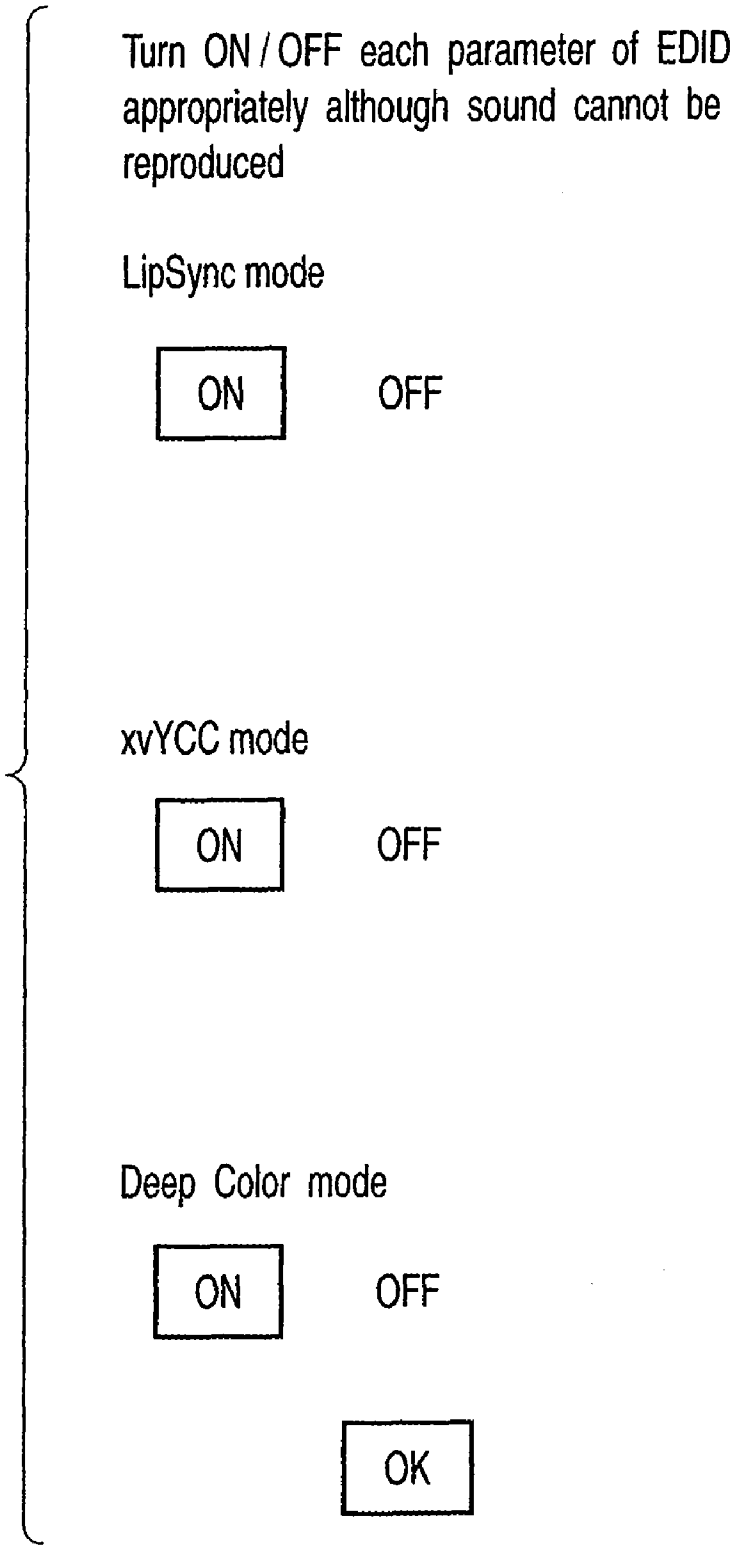
Figure 8:
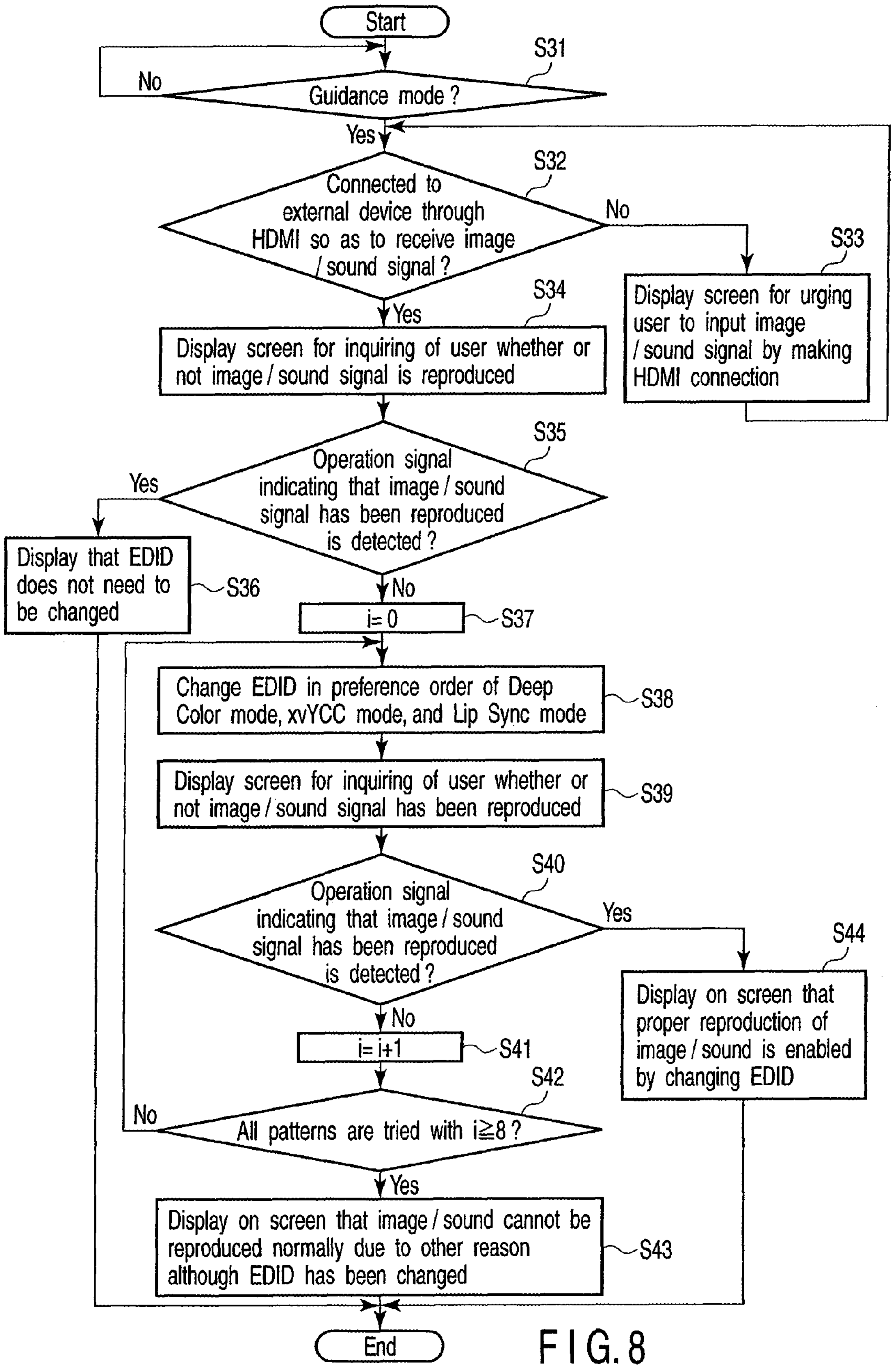
Figure 9:
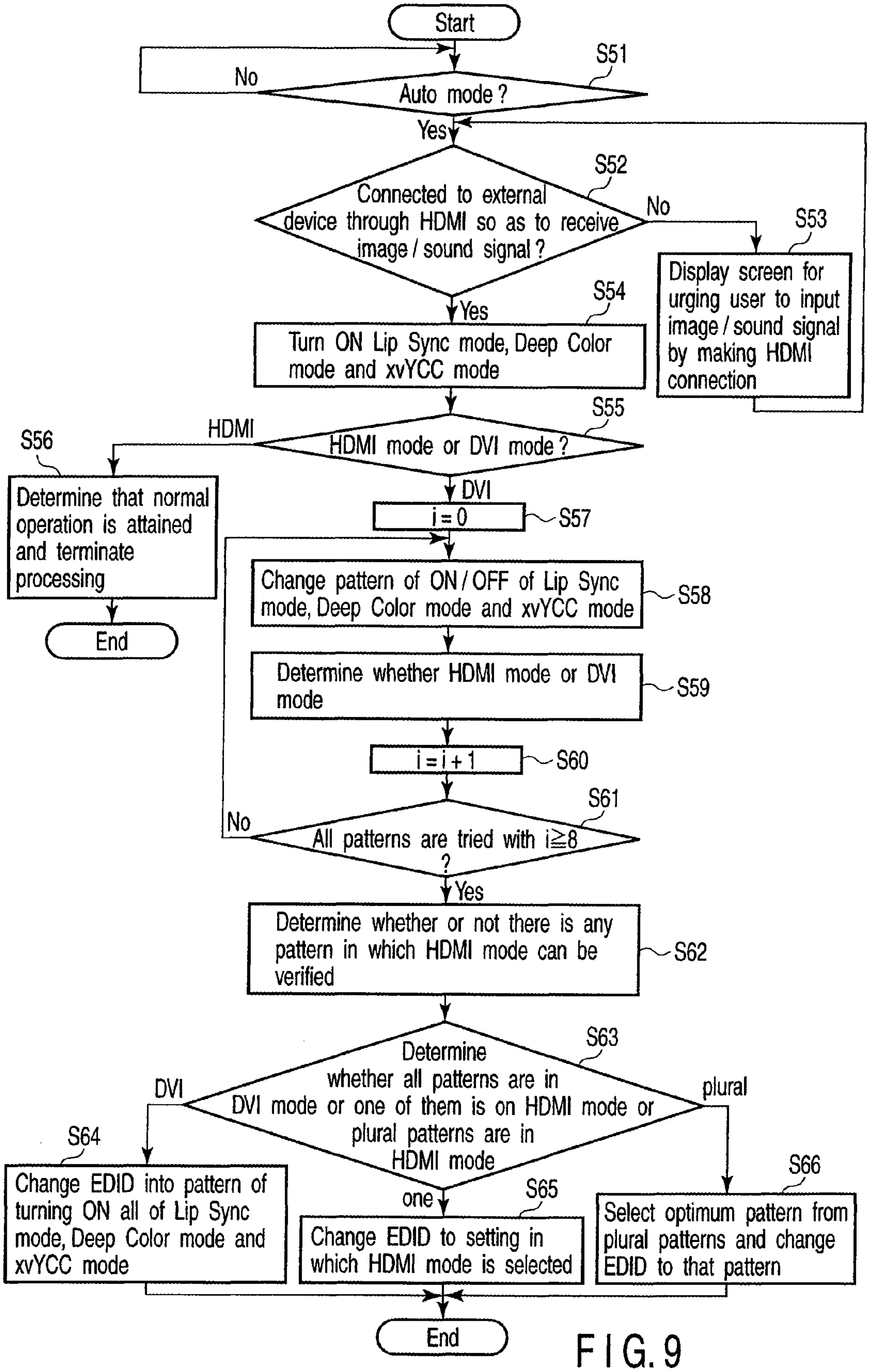

FIG. 3 is a block diagram showing an example of the configuration of the image processing device which is a sink device according to the embodiment of the present invention;

FIG. 4 is a block diagram showing an example of the configuration of the image processing device which is a source device according to the embodiment of the present invention;

FIG. 5 is an explanatory diagram showing an example of a list of the EDID items which are to be changed by the sink device according to the embodiment of the present invention;

FIG. 6 is a flow chart showing an example of EDID changing processing under a manual mode of the image processing device according to the embodiment of the present invention;

FIG. 7 is an explanatory diagram showing an example of an operation instruction screen under a manual mode of the sink device according to the embodiment of the present invention;

FIG. 8 is a flow chart showing an example of EDID changing processing under a guidance mode of the image processing device according to the embodiment of the present invention; and FIG. 9 is a flow chart showing an example of the EDID changing processing under an auto mode of the image processing device according to the embodiment of the present invention.

DETAILED DESCRIPTION

Various embodiments according to the invention will be described hereinafter with reference to the accompanying drawings. In general, according to one embodiment of the invention, an image processing device of the invention includes: a storage portion which stores EDID information; a communication portion which executes communication based on HDMI standard with another image processing device through a communication passage, supplies the EDID information stored in the storage portion and receives an image/sound signal from the another image processing device; a reproducing portion which reproduces the image/sound signal received by the communication portion; and a changing portion which changes the EDID information stored in the storage portion when the reproducing portion cannot reproduce the image/sound signal properly.

Hereinafter, an embodiment of the present invention will be described in detail with reference to the accompanying drawings. The EDID changing processing, described later, according to an embodiment of the present invention is implemented by an image processing device which is a sink device, in an image processing system constituted of a plurality of image processing devices connected through an HDMI cable. That is, in such a case, when the EDID is supplied from a sink device, an inappropriate image sound signal is sent to the sink device because the source device has no function corresponding to the updated EDID, so that no sound can be reproduced by the sink device. To solve this problem, if the EDID is changed appropriately by the sink device and then sent to the source device again, an appropriate image/sound signal can be sent from the source device to the sink device and consequently, the sink device can reproduce the sound signal and the like securely.

<Example of the Configuration of Image Processing System as an Embodiment of the Present Invention>

Figures 1, 2:
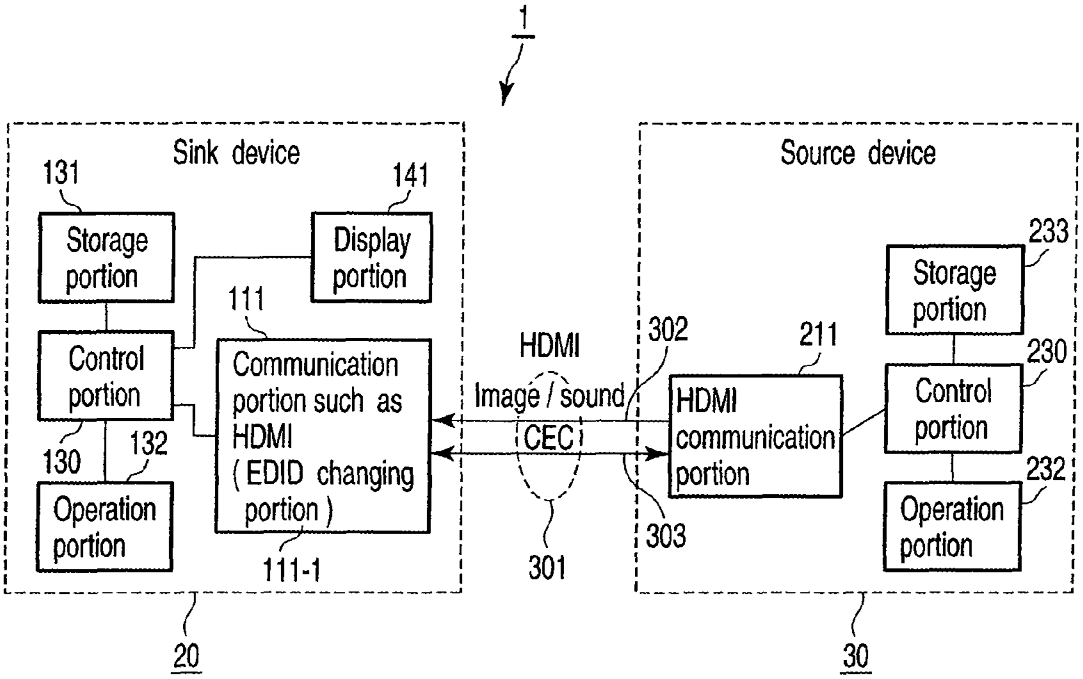
FIG. 1 is a block diagram showing an example of an image processing system having an image processing device of a sink device according to an embodiment of the present invention and an image processing device of a source device connected thereto.
FIG. 2 is an explanatory diagram showing a signal name of an HDMI terminal possessed by the image processing device according to the embodiment of the present invention.

Next, a sink device 20 which executes such EDID changing processing is shown. An example of the configuration of the image processing system, which is an embodiment of the present invention, will be described with reference to the drawings. FIG. 1 is a block diagram showing an example of the image processing system including an image processing device of the sink device 20 according to the embodiment of the present invention, and an image processing device of a source device connected thereto.

An image processing system 1 of the embodiment of the present invention includes the sink device 20 and a source device 30, which are connected through an HDMI cable 301 as shown in FIG. 1. The HDMI cable 301 has an exclusive line 302 for image/sound signal and an exclusive line 303 for control signal and as an example, the exclusive line 302 for image/sound signal communicates more rapidly than the exclusive line 303 for control signal.

The sink device 20 is a device for displaying and outputting image/sound information from the source device 30, and more specifically, is a TV and the like. The source device 30 is a device for supplying the image/sound information to the sink device 20, and more specifically, is an HD DVD player and the like.

The sink device 20 includes a control portion 130, which is a central processing unit, and the control portion 130 controls a storage portion 131, a communication portion 111 containing an EDID changing portion 111-1, a display portion 141 and an operation portion 132. The storage portion 131 is a portion which stores various pieces of setting information, such as a control program of the sink device 20 and sound volume/image display settings (including the EDID described later), and more specifically, is a flash memory, a hard disk drive and the like.

The communication portion 111 is a portion which receives an image/sound signal from the source device 30, sends a command for controlling the source device 30 and receives a command from the source device 30 side, and more specifically, is a high-definition multimedia interface (HDMI), wired local area network (LAN), wireless LAN, Bluetooth (registered trademark) and the like. In the case of the HDMI, a consumer electronics control (CEC) line is used for sending/receiving the control command.

The display portion 141 is a portion which displays images from a menu screen for device control or the source device 30 and reproduces sound, and more specifically, is a liquid crystal panel, a speaker and the like.

On the other hand, the source device 30 includes a control portion 230, which is a central processing unit and controls a storage portion 233, a communication portion 211 and an operation portion 232. The storage portion 233 is a portion which stores various pieces of setting information, such as the control program of the source device 30 and sound volume/image display settings, and holds the image/sound signal, and more specifically, is a flash memory, a hard disk drive, HD DVD drive and the like.

The communication portion 211 is a portion which sends an image/sound signal to the sink device 20, sends a command (control signal) for controlling the sink device 20 and receives a command (control signal) from the sink device 20. The menu screen for controlling the source device 30 is sent to the sink device 20 as an image signal through the communication portion 211. The communication portion 211 is a portion installed based on an interface standard which enables connection with the communication portion 111 on the sink device 20 side, and more specifically, is an HDMI, wired local area network (LAN), wireless LAN, Bluetooth (registered trademark) and the like.

HDMI Terminal

FIG. 2 is an explanatory diagram showing signal names of an HDMI terminal possessed by the image processing device according to an embodiment of the present invention.

If the communication portions 111, 211 are an HDMI, the HDMI terminal has a connector pin arrangement shown in FIG. 2. Particularly, the CEC signal of the $13^{th}$ pin enables control of a mating device by sending/receiving a command defined based on the HDMI-CEC protocol.

<Specific Example of Image Processing System According to an Embodiment of the Present Invention>

Next, a specific example of the above-described image processing system will be described with reference to the drawings. FIG. 3 is a block diagram showing an example of the configuration of the image processing device on the sink device side according to the embodiment of the present invention. FIG. 4 is a block diagram showing an example of the configuration of the image processing device on the source device side.

Sink Device 20

An example of the sink device 20 is a digital TV unit as shown in FIG. 3. The sink device 20 includes a selector portion 116 on the input side and a selector portion 117 on the output side. The communication portion 111 such as the LAN, the HDMI and a display port, a BS/CS (satellite broadcasting) tuner portion 112 and a terrestrial broadcasting tuner portion 113 are connected to the selector portion 116 on the input side so as to output a signal to an encoder portion 121. A satellite antenna is connected to the BS/CS tuner portion 112 and a terrestrial broadcasting antenna is connected to the terrestrial broadcasting tuner portion 113.

The sink device 20 includes a buffer portion 122, an MPEG decoder portion 123, a sound/image processing portion 124, an OSD 125 which superimposes an operation signal or the like on the image signal, and a separating portion 129. These respective portions are connected to the control portion 130 for controlling the entire operation through a data bus. Further, an output of the selector portion 117 is connected to a display portion 141.

Further, the sink device 20 has a remote control communication portion 133 which accepts user's operations or an operation through a remote controller R. The remote controller R enables substantially the same operation as the operation portion 132 provided on the main body of the sink device 20, such as tuner operation, setting of reservation recording and other various settings.

Source Device 30

An example of the source device 30 is a hard disk recorder handling HD DVD as shown in FIG. 4. As shown in FIG. 4, the source device 30 has two kinds of disk drive portions. The first one is an optical disk drive portion 219, which drives an optical disk D as a first medium, which is an information recording medium in which a video file can be built so as to execute reading/writing of information. The optical disk D is, for example, an HD DVD, but is not limited thereto. The second one is a hard disk drive portion 218, which drives a hard disk as a second medium. The control portion 230 is connected to each portion through a data bus for controlling the entire operation.

The source device 30 shown in FIG. 4 includes an encoder portion 221 which constitutes a recording side, an MPEG decoder portion 223 which constitutes a reproduction side, and the control portion 230 for controlling the operation of the device main body, as its major components. The source device 30 has a selector portion 216 on the input side and a selector portion 217 on the output side. The communication portion 211 such as a LAN, a satellite broadcasting (BS/CS) tuner portion 212 and a terrestrial broadcasting tuner portion 213 are connected to the selector portion 216 on the input side so as to output a signal to the encoder portion 221. A satellite antenna is connected to the satellite broadcasting tuner portion 212 and a terrestrial broadcasting antenna is connected to the terrestrial broadcasting tuner portion 213.

The source device 30 includes the encoder portion 221, a data editing portion 220 which receives an output of the encoder portion 221 and executes a desired data processing such as data editing, the hard disk drive portion 218 connected to the data editing portion 220 and the optical disk drive portion 219. Further, the source device 30 includes an MPEG decoder portion 223 which receives a signal from the hard disk drive portion 218 and the optical disk drive portion 219 and decodes it, the encoder portion 221, a buffer portion 222, the MPEG decoder portion 223, a multiplexing portion 228, a separating portion 229, the control portion 230, an OSD portion 234 for synthesizing a desired image on an image screen and a reservation recording portion 243 for generating a reservation list and a program list image. These respective components are connected to the control portion 230 through a data bus. Further, an output of the selector portion 17 is connected to a receiver (not shown) outside and supplied to an outside device through an interface portion 227 for communicating with the outside device.

The source device 30 is connected to the control portion 230 through the data bus and has the operation portion 232 which accepts user's operation or an operation of the remote controller R. The remote controller R enables substantially the same operation as the operation portion 232 provided on the main body of the source device 30, such as a recording/reproduction instruction for the hard disk drive portion 218 and the optical disk drive portion 219, editing instruction, tuner operation, reservation recording setting and other various settings.

An outline of reproduction processing and recording processing in the source device 30 having such a configuration will be given by exemplifying the optical disk. That is, the optical disk D rotated at a predetermined speed under the control of the control portion 230 reflects a laser beam, which is detected by an optical pickup, and then a detection signal based thereon is output. An RF signal is generated based on this detection signal and reproduction processing is carried out subsequent to data reading processing.

In the recording processing of the optical disk, data supplied through the selector portion 216 by an input portion (not shown) under the control of the control portion 230 is supplied to the encoder portion 221, coded and output. A drive current of the laser driver is supplied to the optical pickup corresponding to this coded output and output of the control portion 230 and irradiated to a storage area of the optical disk D to thereby execute recording processing.

The sink device 20 and the source device 30 according to an embodiment of the present invention can be implemented in a TV unit, a hard disk recorder unit and the like as described above. However, the present invention is not limited to these embodiments and may be applied to a number of image processing devices.

<Example of EDID Changing Processing Which the Image Processing Device of the Embodiment of the Present Invention Carries Out>

Next, an example of the EDID changing processing by the image processing device which is the aforementioned sink device 20 will be described in detail with reference to a flow chart.

(Embodiment of the EDID)

First, an example of the EDID changed by the image processing device of the embodiment of the present invention will be described. FIG. 5 is an explanatory diagram showing an example of a list of the EDID items to be changed by the sink device according to the embodiment of the present invention.

That is, the extended display identification data (EDID) is information supplied from the sink device 20 on the display side to the source device 30, which indicates which image/sound signal can be reproduced by the sink device 20. A specific example of an item list is shown below:

"Header
ID manufacturer Name
ID Product Code
ID Serial Number
Week of Manufacture
Year of Manufacture
EDID Version Number
EDID Revision Number
Video Input Definition
Max. Horizontal Image Size
Max. Vertical Image Size
Display Transfer Characteristic (Gamma)
Feature Support
Color Characteristics
Established Timings 1
Established Timings 2
Established Timings 3
Standard Timing Definition
Detailed Timing Description #1-1080p
(59.94/60 Hz)
(preferred)
Detailed Timing Description #2-480p 16:9
(59.94/60 Hz)
(next preferred)
Monitor Descriptor—Monitor Name
Monitor Descriptor—Monitor Range Limits
Extension Flag
Checksum
Tag
Revision Number
Byte number offset
Total Number of Native Formats
Video Tag
Audio Tag
Vender Specific code Tag
(CEC Physical address)
/*Description part of HDMI1.3 (DeepColor, LipSync, xvYCC)*/
(The Changing Processing of the EDID Described Later is Carried Out by Deleting or Adding This Information)
Detailed Timing Description #3-1080i
(59.94/60 Hz)
Detailed Timing Description #4-720p
Horizontal Image Size
Vertical Image Size
Horizontal vertical Image size
Detailed Timing Description #5-480p 4:3
(59.94/60 Hz)
Detailed Timing Description #6-480i 4:3
Checksum (checksum is also corrected according to a change in the EDID.)"

By executing the changing processing described later upon particularly a description part (DeepColor, LipSync, xvYCC) */ of the HDMI1.3, the EDID which cannot be met with the source device is changed to an EDID which can be met. Consequently, an image/sound signal which can be processed is supplied from the source device to the sink device, so that the sink device can improve the sound signal and the like which cannot be reproduced to the one which can be reproduced.

(EDID Changing Processing by Manual Mode)

Next, the EDID changing processing by manual mode which is carried out by the image processing device of the embodiment of the present invention will be described with reference to the drawings. FIG. 6 is a flow chart showing an example of the EDID changing processing by manual mode of the image processing device according to the embodiment of the present invention. FIG. 7 is an explanatory diagram showing an example of an operation instruction screen in the manual mode of the sink device according to the embodiment of the present invention. Note that respective steps of the flow charts of FIGS. 6, 8 and 9 can be replaced with circuit blocks and therefore, the steps of each flow chart can be redefined as blocks.

The sink device 20 has the communication portion 111 such as an HDMI and the communication portion 111 such as the HDMI has an EDID changing portion 111-1 for carrying out the following EDID changing processing. Because a total of eight combinations of ON/OFF of three kinds of modes, LipSync, xvYCC and DeepColor are available, the EDID data of the eight combinations are prepared in a storage area (not shown) built into the storage portion 131 or the communication portion 111 such as the HDMI. A default setting value of these eight kinds of the combinations of the EDID data is all modes on.

If the source device malfunctions, for example, no sound signal is reproduced, when the source device 30 is connected to the sink device 20 through the HDMI, it may sometimes operate properly if the ON/OFF setting of the EDID is changed to OFF. One of three EDID setting methods can be selected; manual mode, guidance mode and auto mode.

When setting manually, any setting of LipSync, xvYCC and DeepColor is changed to ON/OFF. If normal operation is attained after the change, that setting procedure is terminated. If an abnormal operation continues, another setting is tried. If the abnormal operation has still not been resolved after all the combinations (eight patterns) have been tried (or all the settings are turned off), a cause other than the EDID setting can be considered.

As shown in the flow chart of FIG. 6, the EDID changing portion 111-1 of the communication portion 111 such as the HDMI and the control portion 130 determine whether or not the connection is made through the HDMI (step S11). When the EDID changing portion 111-1 and the control portion 130 determine that the connection is made through the HDMI, they determine whether or not an image/sound signal has been received after the EDID is supplied (step S12). When the EDID changing portion 111-1 and the control portion 130 determine that the image/sound signal has been received, they determine whether or not the sound/image processing portion 124 can reproduce this sound signal (step S13).

When the EDID changing portion 111-1 and the control portion 130 confirm that this sound signal is reproduced, they determine whether or not the EDID changing processing is carried out under the manual mode (step S14). Consequently, the changing portion 111-1 and the control portion 130 determine whether or not the EDID change should be carried out under the manual mode, guide mode or auto mode according to a specification or the like set on the menu screen (step S19). When the changing portion 111-1 and the control portion 130 determine that the EDID change should be carried out under the guidance mode, that processing is executed under the guidance mode of FIG. 8 (step S20). When the changing portion 111-1 and the control portion 130 determine that the processing should be carried out under the auto mode, the processing is executed under the auto mode of FIG. 9 (step S21).

When the changing portion 111-1 and the control portion 130 determine that the processing should be carried out under the manual mode, an image signal for displaying the operation screen as shown in FIG. 7 is generated and a user is urged to input that signal. Then, the changing portion 111-1 and the control portion 130 verify first that the LipSync mode is turned ON/OFF according to a user operation signal (step S15). Further, the changing portion 111-1 and the control portion 130 verify that the xvYCC mode is turned ON/OFF (step S16) and then verify that the DeepColor mode is turned ON/OFF (step S17). According to an operation signal of the user who has verified the above, ON/OFF of the LipSync mode, xvYCC mode and Deep Color mode is changed for each EDID stored in a storage area (not shown) of the storage portion 131 or the communication portion 111 such as the HDMI. When these changing processes are completed, all the processes are terminated (step S18).

In this way, the changing portion 111-1 and the control portion 130 can change the EDID information in the manual mode. After that, when the changed EDID information is supplied from the sink device to the source device between the sink device and the source device, the sink device 20 can execute reproduction processing of the image/sound signal securely because the source device can send an appropriate image/sound signal to the sink device 20 corresponding to the new EDID.

(EDID Changing Processing by Guidance Mode)

Next, the EDID changing processing in the guidance mode of the image processing device according to the embodiment of the present invention will be described with reference to the drawings. FIG. 8 is a flow chart showing an example of the EDID changing processes in the guidance mode of the image processing unit according to the embodiment of the present invention.

When the EDID changing portion 111-1 and the control portion 130 of the communication portion 111 such as the HDMI of the sink device 20 determine in the flow chart of FIG. 8 that the guidance mode is set in step S19 of FIG. 6 (step S31), next, they determine whether or not the sink device 20 is connected to such an external device as the source device 30 through the HDMI to receive any image signal (step S32).

Unless the connection is made through the HDMI or any image/sound signal is input, the EDID changing portion 111-1 and the control portion 130 establish the HDMI connection and display a screen for urging the user to input an image/sound signal (step S33).

The EDID changing portion 111-1 and the control portion 130 determine that the HDMI connection is made and an image/sound signal is input, and next display a screen which inquires of the user whether or not this image/sound signal is being reproduced, for example, by displaying "is any image/sound signal given from a source device currently being reproduced?" (step S34). Then, the EDID changing portion 111-1 and the control portion 130 verify whether or not a user operation signal, for example, "YES" meaning that the image/sound signal is being reproduced successfully has been detected (step S35).

When the EDID changing portion 111-1 and the control portion 130 detect a user operation signal, for example, "YES" meaning that such an image/sound signal is being reproduced successfully, a screen informing that the EDID does not need to be changed is displayed (step S36).

However, if the EDID changing portion 111-1 and the control portion 130 cannot detect a user operation signal, like "YES" meaning that such an image/sound signal is being reproduced successfully, first, i=0 is set (step S37). Then, the EDID changing portion 111-1 and the control portion 130 change ON/OFF of each of the DeepColor mode, xvYCC mode and LipSync mode, in this order of preference, for the EDID information stored in the storage portion 131 or a storage area (step S38).

Then, after such a change, the EDID changing portion 111-1 and the control portion 130 display a screen which inquires of the user whether or not an image/sound is being reproduced again (step S39). If the operation signal indicating that the image/sound signal is being reproduced successfully can be verified (step S40), the EDID changing portion 111-1 and the control portion 130 display a screen informing that normal reproduction of the image/sound is enabled by changing the EDID (step S44).

However, if the EDID changing portion 111-1 and the control portion 130 cannot verify any operation signal indicating that the image/sound signal can be reproduced (step S40), i is counted up based on I=i+1 (step S41). Then, the EDID changing portion 111-1 and the control portion 130 verify whether or not all eight patterns have been tried with i≧8. When it is verified that all the patterns have not been tried (step S42), the procedure is returned to step S38 again, in which only one piece of control information is selected with the preference order of DeepColor>xvYCC>LipSync and the EDID is changed to turn off that value (step S39).

The EDID changing portion 111-1 and the control portion 130 execute such processes on all the eight patterns (step S42) and if the operation signal indicating that the image/sound signal is reproduced successfully still cannot be verified (step S40), it is indicated through a screen that the image/sound signal cannot be reproduced normally for another reason although the EDID has been changed (step S43).

If the EDID changing portion 111-1 and the control portion 130 can verify the operation signal indicating that the image/sound signal is being reproduced successfully during execution of these processes (step S40), a screen indicating that normal reproduction of the image/sound signal is enabled by changing the EDID is displayed (step S44).

By entrusting final verification on reproduction of the image/sound signal to judgment of a user, the reproduction processing of the image/sound signal by changing the EDID can be performed further securely.

(EDID Changing Processing by Auto Mode)

Next, the EDID changing processing in the auto mode of the image processing device according to an embodiment of the present invention will be described. FIG. 9 is a flow chart showing an example of the EDID changing processing in the auto mode of the image processing device according to an embodiment of the present invention.

When the EDID changing portion 111-1 and the control portion 130 of the communication portion 111 such as the HDMI of the sink device 20 determine that the auto mode is set up in step S19 of FIG. 6 according to the flow chart of FIG. 9 (step S51), next, they determine whether or not the sink device 20 is connected to such an external device as the source device 30 through the HDMI so as to receive an image signal (step S52).

The EDID changing portion 111-1 and the control portion 130 achieve the HDMI connection if the HDMI connection is not made or no image/sound signal is input and display a screen which urges the user to input an image/sound signal (step S53). This can be determined by confirming that the DDC5V of the HDMI terminal is set high or checking the quantity of effective pixels of an image signal.

When the EDID changing portion 111-1 and the control portion 130 determine that the HDMI connection is achieved and an image/sound signal is input, they turn ON the LipSync mode, DeepColor mode and xvYCC mode of the EDID information (step S54). Consequently, the EDID changing portion 111-1 and the control portion 130 determine whether a currently operating condition is HDMI mode or DVI mode (step S55). This can be determined from information of whether an AVI-Info packet has been sent. As such a detailed determination method, an existing method is applied and description thereof is omitted.

If the currently operating condition is HDMI mode, the EDID changing portion 111-1 and the control portion 130 determine that normal operation is attained and terminate the EDID changing processing (step S56).

However, if the currently operating condition is DVI mode, the EDID changing portion 111-1 and the control portion 130 set i=0 (step S57) first. Then, the EDID changing portion 111-1 and the control portion 130 change part of the pattern of ON/OFF of the LipSync mode, DeepColor mode and xvYCC mode (step S58). After that, the EDID changing portion 111-1 and the control portion 130 determine whether the currently operating condition is HDMI mode or DVI mode as a result of the change (step S59). After the determination, the EDID changing portion 111-1 and the control portion 130 set up i=i+1 (step S60) and after that, set i≧8 and determine whether or not the EDID changing processing and confirmation of the current operating condition have been completed on all the patterns (step S61). Unless they have been done for all the patterns, the procedure is returned to step S58, in which the procedure is repeated.

When the EDID changing portion 111-1 and the control portion 130 determine that the EDID changing processing and confirmation of the currently operating condition have been completed for all the patterns, they determine whether or not there is a pattern in which the HDMI mode can be verified (step S62).

As a result, the EDID changing portion 111-1 and the control portion 130 determine whether all the patterns are of a DVI mode or one of them is of an HDMI mode or plural patterns are the HDMI mode (step S63).

If the EDID changing portion 111-1 and the control portion 130 determine that all the patterns are of the DVI mode, the EDID is changed to a pattern of turning ON all the LipSync mode, DeepColor mode and xvYCC mode because there is no problem in the EDID (step S64).

If the EDID changing portion 111-1 and the control portion 130 determine that one pattern is of the HDMI mode, the EDID is changed to the setting in which the HDMI mode is selected (step S65).

If the EDID changing portion 111-1 and the control portion 130 determine that plural patterns have turned to the HDMI mode, they select an optimum pattern from the plural patterns and change the EDID to that pattern (step S66).

That is, in the case where there are plural patterns which have turned to the HDMI mode, the EDID changing portion 111-1 and the control portion 130 select a combination of DeepColor:ON/xvYCC:ON/LipSync:OFF, if any pattern turns to the HDMI mode by turning any of them to OFF in the combination of ON/OFF of the LipSync, xvYCC and DeepColor, for example, under a preference order of DeepColor>xvYCC>LipSync. It is preferable to select a pattern having many ONs. If there are plural patterns which have turned to the HDMI mode, it is also preferable to allow the user to select which should be turned to ON and which should be turned to OFF by presenting a list of pieces of control information about LipSync, xvYCC and DeepColor to the user.

In the case of setting in the auto mode, if the EDID is written in an EEPROM or the like, it is preferable to place an indication saying "Don't turn off power" or the like because it takes a long time for rewriting. Further, because the setting on the auto mode takes a long time, it is preferable to permit this setting through a menu but not to execute this setting when changing over a port or when the power is turned on.

The setting value here is not reset when the power is turned ON/OFF and preferably is not reset until the setting is initialized.

While the EDID is being rewritten, the EDID changing portion 111-1 and the control portion 130 need to set hot plug detection (HPD) to low to prevent the EDID from being accessed from the source device. In order to reset the source device securely, the EDID changing portion 111-1 and the control portion 130 return the HPD to high after keeping it on low for about 500 msec. After it is returned to high, whether or not the pattern turns to the HDMI mode is verified by waiting for a sufficient time and if not, next EDID data is written. This procedure is repeated eight times at maximum and if the HDMI mode is still not attained, rewriting of the HDID is tried again in order to return all the settings to ON.

As described above, in the sink device 20 of an embodiment of the present invention, the processing for changing the EDID is executed appropriately.

Consequently, the manual mode allows description on the EDID concerning LipSync, xvYCC and DeepColor to be turned ON/OFF through the menu.

As a result, the source device which malfunctions by reading EDID corresponding to the HDMI1.3 can be operated normally.

Further, the guidance mode allows the user to check a reproduction condition of image/sound processing securely by operating and checking following a guide instructed on a TV screen.

Under the auto mode, determination of whether or not a malfunction occurs and the EDID changing processing corresponding thereto can be automatically executed.

As for information which is difficult to reproduce due to a fault of the EDID information under the above-described embodiments, not only a sound signal but also an image signal sometimes cannot be reproduced. Further, a case where both an image signal and sound signal cannot be reproduced is covered by the scope of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising:

a storage portion configured to store EDID (extended display identification data) information;

a communication portion configured to execute communication based on a first HDMI standard with another image processing device through a communication passage, supply the EDID information stored in the storage portion, and receive an image/sound signal from the other image processing device through the communication passage;

a reproducing portion configured to reproduce the image/sound signal received by the communication portion;

a changing portion configured to change the EDID information stored in the storage portion to EDID information supporting a second HDMI standard that is different from the first HDMI standard and supply the changed EDID information to the other image processing device using the communication portion when the reproducing portion is incapable of reproducing the image/sound signal properly; and a display configured to display a message that turning off power supply is inhibited when the changing portion is changing the EDID information stored in the storage portion.

2. An image processing device according to claim 1, wherein the changing portion is configured to change the EDID information stored in the storage portion according to a supplied operation signal.

3. An image processing device according to claim 1, wherein the changing portion is configured to cause a screen to be displayed for inquiring whether or not reproduction by the reproducing portion is executed successfully and, when receiving an operation signal meaning that the reproduction by the reproducing portion is not executed successfully, change the EDID stored in the storage portion.

4. An image processing device according to claim 1, wherein the changing portion is configured to, when detecting that the reproducing portion is incapable of reproducing the image/sound signal, change the EDID stored in the storage portion.

5. An image processing device according to claim 1, wherein the changing portion is configured to change the EDID by changing ON/OFF of control information of LipSync, xvYCC and DeepColor possessed by the EDID.

6. An image processing device according to claim 1, wherein the changing portion is configured to prepare the EDID of eight patterns of combinations of ON/OFF of the control information of LipSync, xvYCC and DeepColor and select any one thereof.

7. An image processing device according to claim 1, wherein the changing portion is configured to set up a preference order for the control information of the DeepColor, xvYCC and LipSync and turn only one piece of control information OFF selectively following the preference order.

8. An image processing device according to claim 1, wherein the changing portion is configured to generate image information for displaying a screen for use in selecting any one of the pieces of control information of the DeepColor, xvYCC and LipSync.

9. An image processing device according to claim 1, wherein the reproducing portion is configured to generate image information corresponding to the message which indicates that power is not to be turned off while the changing portion is changing the EDID.

10. An image processing method comprising:

connecting a first image processing device having EDID (extended display identification data) information with a second image processing device through a communication passage based on a first HDMI standard;

obtaining the EDID information from the first image processing device by means of the second image processing device and supplying an image/sound signal corresponding to the EDID information to the first image processing device;

receiving the image/sound signal from the second image processing device by the first image processing device and reproducing the image/sound signal;

when the first image processing device is incapable of reproducing the image/sound signal, changing the EDID information stored in a storage portion to EDID information supporting a second HDMI standard which is different from the first HDMI standard and supply the changed EDID information to the second image processing device; and displaying a message that turning off power supply is inhibited during the changing of the EDID information stored in the storage portion.

* * * * *